(12) United States Patent
Webb et al.

(10) Patent No.: US 6,188,437 B1
(45) Date of Patent: Feb. 13, 2001

(54) DEINTERLACING TECHNIQUE

(75) Inventors: Richard Whitby Webb, Cupertino; Michael J. Lightstone, Fremont, both of CA (US)

(73) Assignee: ATI International SRL, Christ Church (KN)

( * ) Notice: Under 35 U.S.C. 154(b), the term of this patent shall be extended for 0 days.

(21) Appl. No.: 09/219,469

(22) Filed: Dec. 23, 1998

(51) Int. Cl.$^7$ ........................................ H04N 7/01
(52) U.S. Cl. ............................. 348/448; 348/441
(58) Field of Search .................... 348/448, 449, 348/450, 451, 452, 458; H04N 7/01

(56) References Cited

U.S. PATENT DOCUMENTS

| | | | |
|---|---|---|---|
| 4,472,732 | 9/1984 | Bennett et al. | 358/22 |
| 4,631,750 | 12/1986 | Gabriel et al. | 382/41 |
| 4,680,628 | 7/1987 | Wojcik et al. | 358/111 |
| 4,908,874 | 3/1990 | Gabriel | 382/41 |
| 4,941,045 * | 7/1990 | Birch | 348/448 |
| 4,947,251 | 8/1990 | Hentschel | 358/166 |
| 4,982,280 | 1/1991 | Lyon et al. | 358/105 |
| 4,989,090 | 1/1991 | Campbell et al. | 358/140 |
| 5,014,119 | 5/1991 | Faroudja | 358/37 |
| 5,046,164 * | 9/1991 | Hurst, Jr. | 348/448 |
| 5,128,791 | 7/1992 | LeGall et al. | 358/141 |
| 5,134,480 | 7/1992 | Wang et al. | 358/140 |
| 5,151,783 | 9/1992 | Faroudja | 358/133 |
| 5,159,451 | 10/1992 | Faroudja et al. | 358/140 |
| 5,237,414 | 8/1993 | Faroudja | 358/162 |
| 5,289,305 | 2/1994 | Lake, Jr. | 348/578 |
| 5,327,240 | 7/1994 | Golston et al. | 348/607 |
| 5,408,270 | 4/1995 | Lim | 348/429 |
| 5,428,398 | 6/1995 | Faroudja | 348/452 |
| 5,467,138 | 11/1995 | Gove | 348/452 |
| 5,508,746 | 4/1996 | Lim | 348/429 |
| 5,596,371 | 1/1997 | Pakhchyan et al. | 348/452 |
| 5,602,654 | 2/1997 | Patti et al. | 358/461 |
| 5,661,525 | 8/1997 | Kovacevic et al. | 348/452 |
| 5,689,305 | 11/1997 | Ng et al. | 348/416 |
| 5,943,099 * | 8/1999 | Kim | 348/452 |

* cited by examiner

Primary Examiner—Michael Lee
(74) Attorney, Agent, or Firm—Skjerven, Morrill, MacPherson LLP; Edward C. Kwok; Carmen C. Cook

(57) ABSTRACT

An improved deinterlacing technique is provided. In one embodiment, a method for deinterlacing includes receiving an interlaced frame of data, the frame including a primary field and a secondary field, and deinterlacing the frame, the deinterlacing including computing an output pixel, PIXOUT, of the secondary field based on an input pixel, PIXIN, of the secondary field, a bottom pixel, BOTTOM, of the primary field, and a top pixel, TOP, of the primary field, in which PIXOUT is computed according to an input/output curve that converges to an average of BOTTOM and TOP. The deinterlacing technique in accordance with this embodiment minimizes spatial artifacts and efficiently generates each output pixel value from only three input pixels.

20 Claims, 3 Drawing Sheets

DEINTERLACING TECHNIQUE

FIELD OF THE INVENTION

The present invention relates to deinterlacing of video data and, in particular, to an improved deinterlacing (line-doubling) technique.

BACKGROUND OF THE INVENTION

Video is generally represented as sequences of frames in accordance with either the interlaced or the progressively-scanned format (non-interlaced). Each frame includes a matrix of pixels that vary in color and intensity according to the image displayed.

Referring to FIG. 1, in the interlaced scan format, a frame, which is a raster array of image bytes representing an image, includes a pair of fields, in which a field is a raster array of image bytes representing every other row of a frame and are derived from two different instants. The primary field of the pair of fields, for example, is the input field associated with the time instant for which the output frame is to be constructed and includes pixels that are located only on alternate rows (either odd or even rows) of the frame matrix, called horizontal lines. The secondary field includes pixels that are located on the corresponding horizontal lines of the frame matrix which are the missing pixels in the primary field. The pixels in the secondary field represent the portions of the image not represented in the primary field. The primary and secondary fields of a frame are scanned consecutively, for example, on a video display monitor at a rate of 60 fields/sec for purposes of reconstructing the entire image on the display at the industry interlaced scan standard 30 frames/sec display rate.

In the progressively scanned format, an image is represented in its entirety using only a single field that includes pixels in all horizontal lines of the frame matrix. Therefore, such frames can be progressively scanned on a display at the standardized progressive display rate of 60 frames/sec.

Conventional television systems receive frames of video signals in an interlaced format. For example, the National Television System Committee (NTSC) standard is used to send and receive frames of television signals at a rate of 30 frames/second. Each frame contains 525 lines of video scan lines, which are divided into two interlaced fields. The interlaced fields are transmitted at a rate of 60 fields/second, or 30 frames/second. The receiver scans the two interlace fields of each frame, one by one, to display the interlaced video signals as television pictures.

Several video applications also use interlace scanning during image origination or capture as well as during signal transmission from the encoder, which codes the video signal, to the receiver. For example, digital video compression methods, such as the ISO (International Standards Organization) MPEG (Moving Pictures Expert Group) video compression standard, may be used to reduce the data rate to a level suitable for transmission over an available digital channel.

However, the display for these digitally compressed video image sequences at the decoders may not use interlaced scanning, or it may be desirable to use non-interlaced displays. For example, in large screen television displays, multimedia displays, or computer displays that support many text-oriented or graphics-oriented applications, a non-interlaced format is often preferred over an interlaced format for a variety of reasons, such as the lower costs associated with implementing the progressively scanned format technology.

Thus, there is a need to convert an interlaced format to a non-interlaced format. The process of converting an interlaced format to a non-interlaced format is generally referred to as deinterlacing (or line-doubling). Referring to FIG. 1, each pair of pixels, e.g. pixels 101 and 102, contains four 8-bit values. The four values include two luminance values, one Red-chroma (Cr) value and one Blue-chroma (Cb) value. Deinterlacing involves comparing these four values in the primary field with their respective values in the secondary field and deinterlacing the values independently of each other. Deinterlacing can be used to convert interlaced still pictures to non-interlaced still pictures, or to provide display of interlaced video on a progressive display (non-interlaced) computer monitor.

Several techniques for deinterlacing a sequence of frames in the interlaced scan format have been developed to provide images to be displayed on the higher image quality, progressively scanned format display equipment. A simple technique is to merge the odd and even fields. However, this technique causes spatial artifacts. Other conventional deinterlacing techniques utilize fixed numerical thresholds to adapt to changing image content between fields (i.e., to minimize spatial artifacts) or utilize computationally intensive approaches, such as contour deinterlacing or spatio-temporal deinterlacing interpolation for estimating the values of missing pixels in an interlaced frame.

BRIEF SUMMARY OF THE INVENTION

The present invention provides an improved deinterlacing technique that reconstructs regions of an image that change monotonically in the vertical direction (i.e., vertical deinterlacing). The present invention adapts to the image content without using fixed numerical thresholds or spatio-temporal interpolation techniques. Rather, deinterlacing in accordance with the teachings of the present invention uses, for example, three localized input pixel values to produce an output pixel value that minimizes spatial artifacts (i.e., accurately reconstructs regions that change monotonically in the vertical direction). Thus, the present invention provides a higher quality and more computationally efficient deinterlacing technique than the conventional deinterlacing techniques. The deinterlacing technique of the present invention adapts to image content and is noise tolerant (i.e., small deviations in the input pixel value produce only small changes in the output pixel value). For example, the present invention can provide an efficient deinterlacing implementation for a computer that includes, for example a SIMD architecture based microprocessor or the well known INTEL PENTIUM MMX microprocessor.

In one embodiment, a method for deinterlacing includes receiving an interlaced frame of data, the frame including a primary field and a secondary field, and deinterlacing the frame, the deinterlacing including computing an output pixel, PIXOUT, of the secondary field based on an input pixel, PIXIN, of the secondary field, a bottom pixel, BOTTOM, of the primary field, and a top pixel, TOP, of the primary field, in which PIXOUT is computed according to an input/output curve that converges to an average of BOTTOM and TOP.

In one embodiment, the deinterlacing method further includes setting a value MIN equal to a minimum of TOP and BOTTOM, setting a value MAX equal to a maximum of TOP and BOTTOM, setting a value AVG equal to the average of TOP and BOTTOM, setting a slope from MIN, SMN, equal to MIN+MIN+(−PIXIN), and setting a slope from MAX, SMX, equal to MAX+MAX+(−PIXIN), setting a first bound, BND1, equal to SMN if SMN is less than AVG, setting the BND1 equal to AVG if SMN is not less than AVG (that is, is greater than or equal to AVG), setting a second bound, BND2, equal to SMX if SMX is greater than AVG, and setting BND2 equal to AVG if SMX is not greater than AVG (that is, is less than or equal to AVG). The deinterlacing method also includes setting PIXOUT equal to BND1 if PIXIN is less than MIN, setting PIXOUT equal to PIXIN if PIXIN is less than MAX and PIXIN is not less than MIN, and setting PIXOUT equal to BND2 if PIXIN is not less than MAX. The method includes merging computed pixels of the secondary field with input pixels of the primary field to provide a deinterlaced frame based on the interlaced frame data. Accordingly, the deinterlacing method of the present invention generates each output pixel value from only three input pixels. The deinterlacing method is computationally efficient and minimizes spatial artifacts.

BRIEF DESCRIPTION OF THE DRAWINGS

The foregoing and other aspects and advantages of the present invention will become apparent from the following detailed description with reference to the drawings, in which.

DETAILED DESCRIPTION OF THE INVENTION

An improved deinterlacing technique is provided. As will be further discussed below, the present invention uses a computationally efficient and high quality deinterlacing technique to provide missing pixel values in a frame being deinterlaced. For example, the present invention provides high quality display of interlaced video on a progressive display (non-interlaced) monitor or high quality conversion of interlaced still pictures to non-interlaced still pictures.

Figure 1:
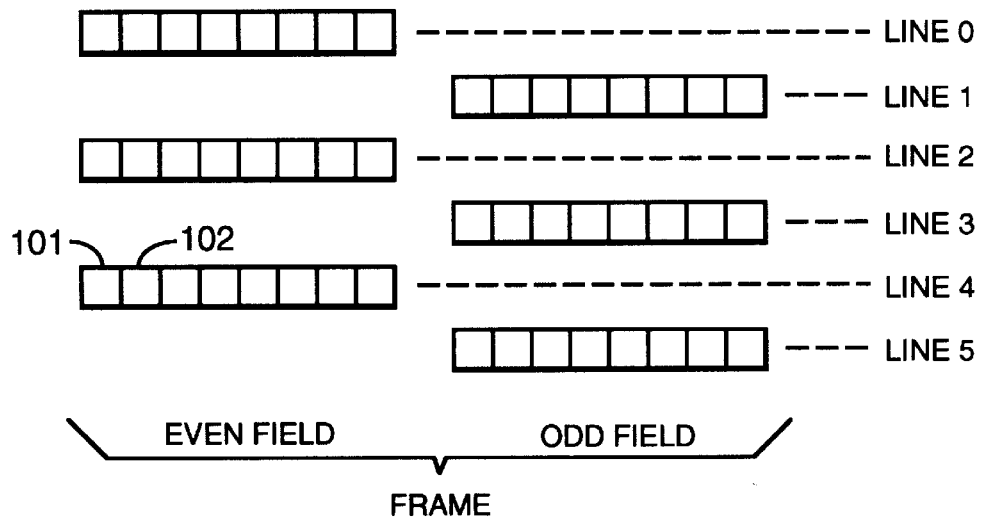
FIG. 1 illustrates the fields in an interlaced frame of video.
Figure 2:
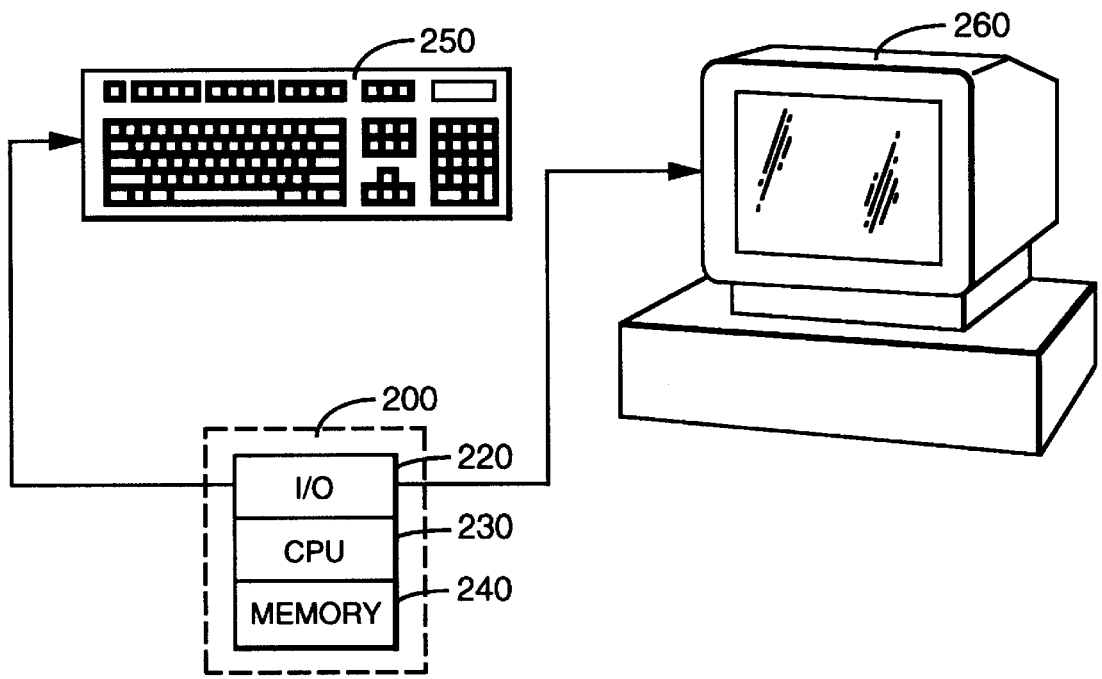
FIG. 2 is a block diagram of exemplary hardware in accordance with one embodiment of the present invention.

FIG. 2 illustrates a data processing system in accordance with the teachings of the present invention. FIG. 2 shows a computer 200, which includes three major elements. Computer 200 includes an input/output (I/O) circuit 220, which is used to communicate information in appropriately structured form to and from other portions of computer 200. Computer 200 includes a control processing unit (CPU) 230 in communication with I/O circuit 220 and a memory 240 (e.g., volatile and non-volatile memory). These elements are those typically found in most general-purpose computers and, in fact, computer 200 is intended to be representative of a broad category of data processing devices. A raster display monitor 260 is shown in communication with I/O circuit 220 and is issued to display images generated by CPU 230. Any well-known variety of cathode ray tube (CRT) or other type of display can be used as display 260. For example, monitor 260 can be a progressive display (non-interlaced) monitor. A conventional keyboard 250 is also shown in communication with I/O circuit 220. It will be appreciated by one of ordinary skill in the art that computer 200 can be part of a larger system. For example, computer 200 can also be in communication with a network (e.g., connected to a Local Area Network (LAN) or the Internet).

In particular, computer 200 can include deinterlacing circuitry for performing deinterlacing in accordance with the teachings of the present invention, or as will be appreciated by one of ordinary skill in the art, the present invention can be implemented in software stored in and executed by computer 200. For example, a computer program implementing the deinterlacing technique in accordance with the teachings of the present invention, stored in memory 240, can be executed on CPU 230, in accordance with one embodiment of the present invention.

Figure 3:
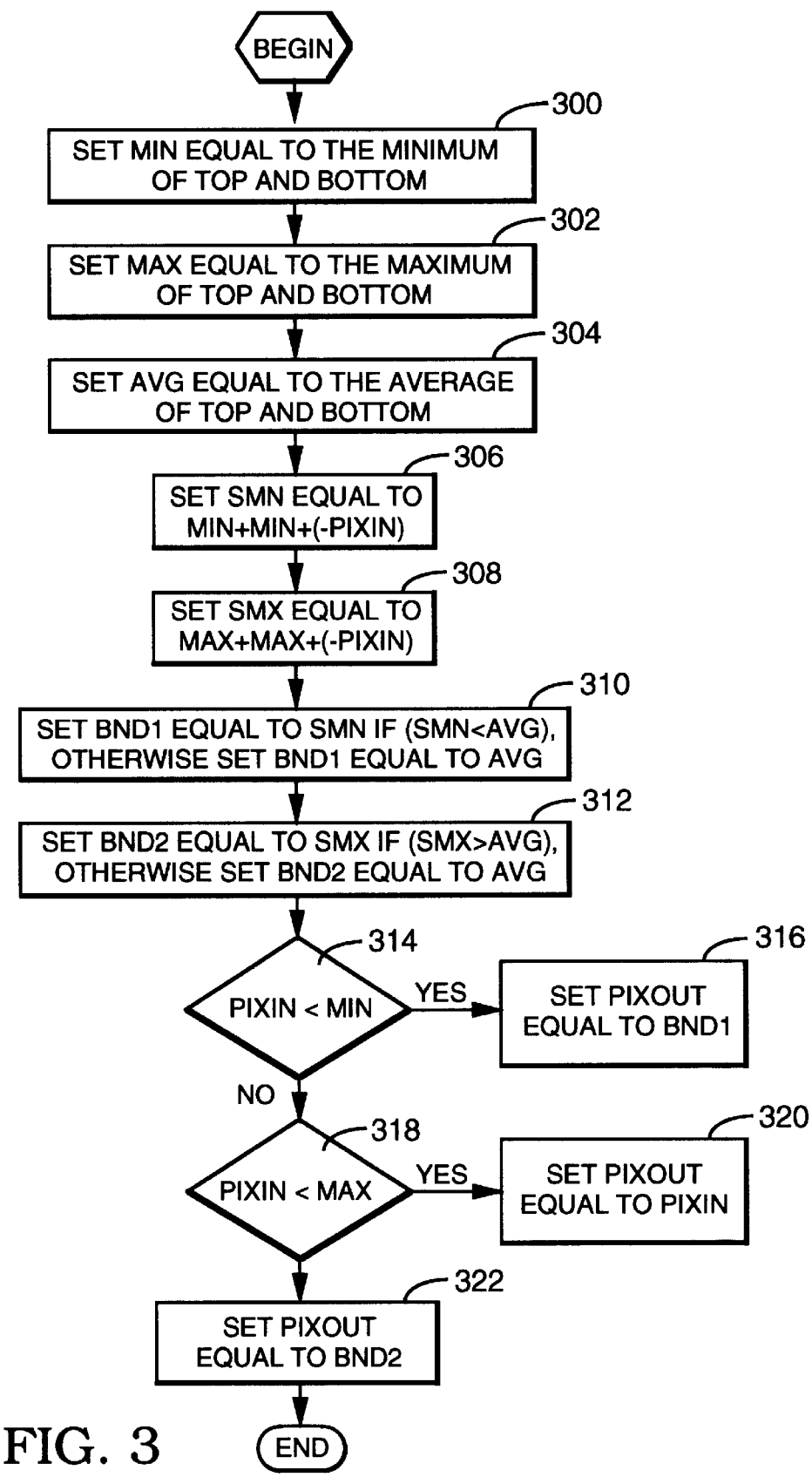
FIG. 3 is a flow diagram of a deinterlacing technique in accordance with one embodiment of the present invention.

FIG. 3 is a flow diagram of a deinterlacing technique in accordance with one embodiment of the present invention. Generally, an interlaced frame of data is received. The interlaced frame of data is deinterlaced to provide a deinterlaced frame of data. In particular, an output frame is constructed by merging unmodified pixels from the primary field with computed pixels in the secondary field.

Figure 4:
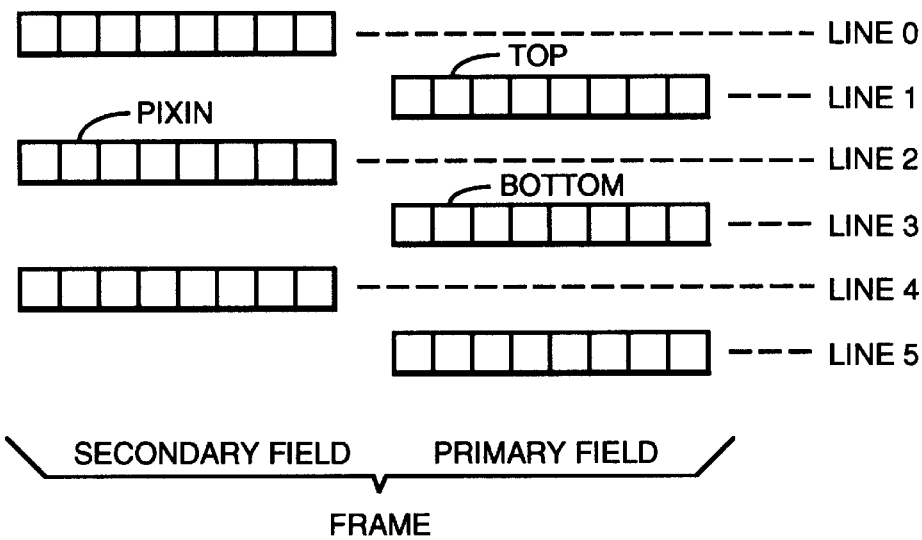
FIG. 4 illustrates the spatial relationship of input pixel values TOP, PIXIN, and BOTTOM used in the deinterlacing technique of the present invention.

In the deinterlacing technique of the present invention, the computed pixels in the secondary field are generated using only three input pixels: PIXIN, TOP, and BOTTOM. FIG. 4 illustrates the spatial relationship of PIXIN, TOP, and BOTTOM. PIXIN represents the input pixel value, which is a pixel from the secondary field. TOP represents a pixel value of the pixel spatially (vertically) above PIXIN, which is a parameter of the input/output characteristics of the deinterlacing technique of the present invention (see FIG. 5). BOTTOM represents a pixel value of the pixel spatially below PIXIN, which is also a parameter of the input/output characteristics of the deinterlacing technique of the present invention. PIXOUT represents the output pixel value that is computed using the deinterlacing technique as shown in the flow diagram of FIG. 3.

Referring to FIG. 3, at stage 300, a minimum, MIN, is set equal to the minimum of TOP and BOTTOM. At stage 302, a maximum, MAX, is set equal to the maximum of TOP and BOTTOM. At stage 304, an average, AVG, is set equal to the average of TOP and BOTTOM. At stage 306, a slope from the MIN, SMN, is set equal to the value of MIN+MIN+(−PIXIN). At stage 308, a slope from the MAX, SMX, is set equal to the value of MAX+MAX+(−PIXIN). At stage 310, a first bound, BND1, is set equal to SMN if SMN is less than AVG. Otherwise, if SMN is greater than or equal to AVG, BND1 is set equal to AVG. At stage 312, a second bound, BND2, is set equal to SMX if SMX is greater than AVG. Otherwise, if SMX is less than or equal to AVG, BND2 is set equal to AVG. At stage 314, whether or not PIXIN is less than MIN is determined. If so, PIXOUT is set equal to BND1 at stage 316. Otherwise, whether or not PIXIN is less than MAX is determined at stage 318. If so, PIXOUT is set equal to PIXIN at stage 320. Otherwise, when PIXIN is greater than or equal to MAX, PIXOUT is set equal to BND2 at stage 322.

Figure 5:
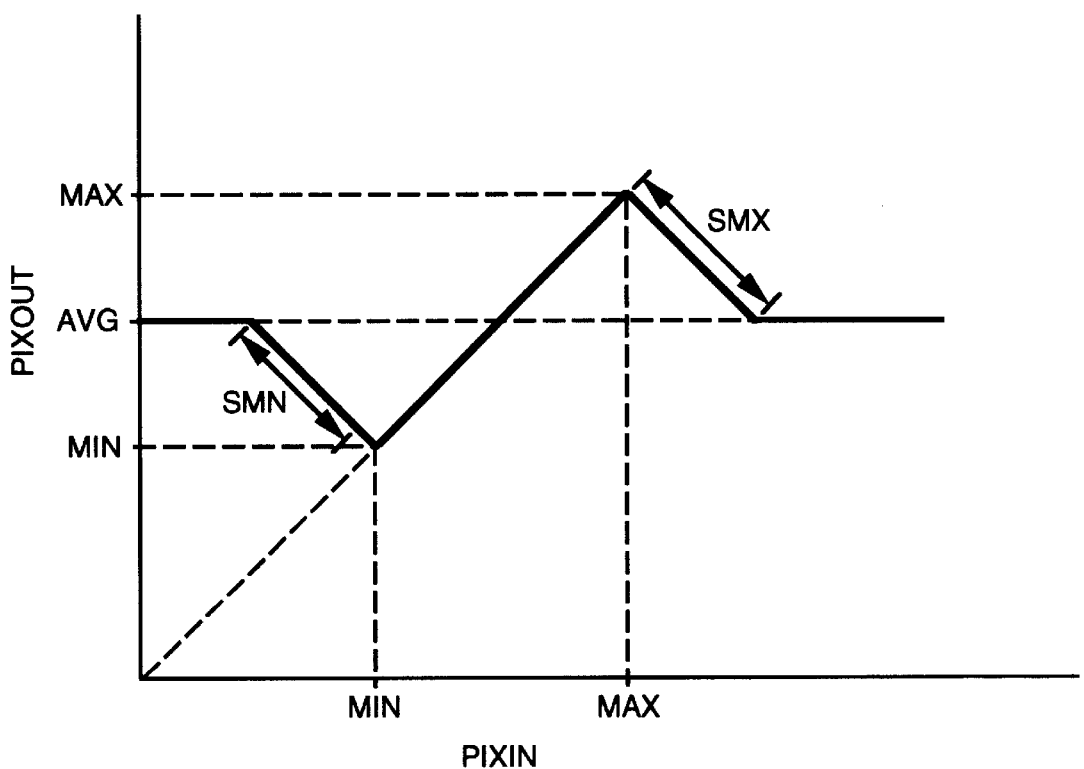
FIG. 5 is a graph that illustrates an input/output curve of the deinterlacing technique in accordance with one embodiment of the present invention.

FIG. 5 is a graph that illustrates the input/output curve (characteristics) of the deinterlacing technique in accordance with one embodiment of the present invention. As illustrated in the graph of FIG. 5, the input/output curve passes through (MIN, MIN) and (MAX, MAX), and the input/output curve converges to AVG for large and small input values. In one embodiment, the PIXOUT value for each computed pixel in the secondary field is computed in accordance with the input/output characteristics illustrated in the graph of FIG. 5.

Accordingly, in one embodiment, each output pixel (PIXOUT) is efficiently generated using only three input pixels. The computed pixels can be computed using any input/output curves having the following characteristics: the input/output curve passes continuously through (MIN, MIN) and (MAX, MAX) without breaks or jumps, and the input/output curve converges to AVG for large and small input values.

Although particular embodiments of the present invention have been shown and described, it will be obvious to those skilled in the art that changes and modifications can be made without departing from the present invention in its broader aspects. For example, the present invention can be implemented in hardware, such as deinterlacing circuitry, or as would be apparent to one of ordinary skill in the art, the present invention can be implemented in software using a variety of programming languages, such as the well-known C programming language or a variety of other languages. Therefore, the appended claims are to encompass within their scope all such changes and modifications that fall within the true scope of the present invention.

We claim:

1. A computer implemented method for deinterlacing, the computer implemented method comprising:
   receiving an interlaced frame of data, the frame comprising a primary field and a secondary field; and
   deinterlacing the frame, the step of deinterlacing comprising:
      computing an output pixel (PIXOUT) of the secondary field based on the values of an input pixel (PIXIN) of the secondary field, a bottom pixel (BOTTOM) of the primary field, BOTTOM being a pixel spatially below PIXIN, and a top pixel (TOP) of the primary field, TOP being a pixel spatially above PIXIN, wherein PIXOUT is computed according to an input/output curve that converges to an average of BOTTOM and TOP.

2. The computer implemented method of claim 1 wherein the deinterlacing further comprises:
   setting a value MIN equal to a minimum of the TOP and the BOTTOM; and
   setting a value MAX equal to a maximum of the TOP and the BOTTOM;
   wherein the input/output curve passes through the points (MIN, MIN) and (MAX, MAX).

3. The computer implemented method of claim 2 wherein the deinterlacing further comprises:
   setting a value AVG equal to the average of the TOP and the BOTTOM, to which the input/output curve for computing PIXOUT converges for large and small input pixel values.

4. The computer implemented method of claim 3 wherein the deinterlacing further comprises:
   setting a slope SMN from MIN equal to MIN+MIN+(−PIXIN); and
   setting a slope SMX from MAX equal to MAX+MAX+(−PIXIN);
   wherein the slope SMN and the slope SMX each defines a portion of the input/output curve.

5. The computer implemented method of claim 4 wherein the deinterlacing further comprises:
   setting a first bound, BND1, equal to the slope SMN from MIN if SMN is less than AVG; and
   setting BND1 equal to AVG if the slope SMN is not less than AVG;
   wherein the first bound BND1 defines a first portion of the input/output curve.

6. The computer implemented method of claim 5 wherein the deinterlacing further comprises:
   setting a second bound, BND2, equal to the slope SMX from MAX if SMX is greater than AVG; and
   setting BND2 equal to AVG if the slope SMX is not greater than AVG;
   wherein the second bound BND2 defines a second portion of the input/output curve.

7. The computer implemented method of claim 6 wherein the deinterlacing further comprises:
   setting PIXOUT equal to BND1 if PIXIN is less than MIN.

8. The computer implemented method of claim 7 herein the deinterlacing further comprises:
   setting PIXOUT equal to PIXIN if PIXIN is less than MAX, and PIXIN is not less than MIN.

9. The computer implemented method of claim 8 wherein the deinterlacing further comprises:
   setting PIXOUT equal to BND2 if PIXIN is not less than MAX.

10. The computer implemented method of claim 9 wherein the deinterlacing further comprises:
    merging computed pixels of the secondary field with input pixels of the primary field to produce a deinterlaced frame of data based on the interlaced frame of data.

11. A computer program for deinterlacing embodied in a computer readable medium, the computer program comprising instructions for:
    receiving an interlaced frame of data, the frame comprising a primary field and a secondary field; and
    deinterlacing the frame, the deinterlacing comprising instructions for:
       computing an output pixel (PIXOUT) of the secondary field based on an input pixel (PIXIN) of the secondary field, a bottom pixel (BOTTOM) of the primary field, BOTTOM being a pixel spatially below PIXIN, and a top pixel (TOP) of the primary field, TOP being a pixel spatially above PIXIN, wherein PIXOUT is computed according to an input/output curve that converges to an average of BOTTOM and TOP.

12. The computer readable medium of claim 11 wherein the deinterlacing further comprises instructions for:
    setting a value MIN equal to a minimum of the TOP and the BOTTOM; and
    setting a value MAX equal to a maximum of the TOP and the BOTTOM;
    wherein the input/output curve passes through the points (MIN, MIN) and (MAX, MAX).

13. The computer readable medium of claim 12 wherein the deinterlacing further comprises instructions for:
    setting a value AVG equal to the average of the TOP and the BOTTOM to which the input/output curve for computing PIXOUT converges for large and small input pixel values.

14. The computer readable medium of claim 13 wherein the deinterlacing further comprises instructions for:
    setting a slope SMN from MIN equal to MIN+MIN+(−PIXIN); and
    setting a slope SMX, from MAX equal to MAX+MAX+(−PIXIN);
    wherein the slope SMN and the slope SMX each defines a portion of the input/output curve.

15. The computer readable medium of claim 14 wherein the deinterlacing further comprises instructions for:
  setting a first bound, BND1, equal to the slope SMN from MIN if SMN is less than AVG; and
  setting BND1 equal to AVG if the slope SMN is not less than AVG;
  wherein the first bound BND1 defines a first portion of the input/output curve.

16. The computer readable medium of claim 15 wherein the deinterlacing further comprises instructions for:
  setting a second bound, BND2, equal to the slope SMX from MAX if SMX is greater than AVG; and
  setting BND2 equal to AVG if the slope SMX is not greater than AVG;
  wherein the second bound BND2 defines a second portion of the input/output curve.

17. The computer readable medium of claim 16 wherein the deinterlacing further comprises instructions for:
  setting PIXOUT equal to BND1 if PIXIN is less than MIN.

18. The computer readable medium of claim 17 wherein the deinterlacing further comprises instructions for:
  setting PIXOUT equal to PIXIN if PIXIN is less than MAX, and PIXIN is not less than MIN.

19. The computer readable medium of claim 18 wherein the deinterlacing further comprises instructions for:
  setting PIXOUT equal to BND2 if PIXIN is not less than MAX.

20. The computer readable medium of claim 19 wherein the deinterlacing further comprises instructions for:
  merging computed pixels of the secondary field with input pixels of the primary field to produce a deinterlaced frame of data based on the interlaced frame of data.

* * * * *